United States Patent [19]

Kohno et al.

[11] Patent Number: 5,910,281
[45] Date of Patent: Jun. 8, 1999

[54] METHOD FOR RESTORING DRIED AQUEOUS ORGANIC GEL CAPSULES

[75] Inventors: Yasushi Kohno; Yoichi Ido, both of Shizuoka; Masayoshi Minami; Riichi Minamiguchi, both of Osaka, all of Japan

[73] Assignee: Yazaki Corporation, Tokyo, Japan

[21] Appl. No.: 08/662,083

[22] Filed: Jun. 12, 1996

[51] Int. Cl.⁶ .............. B29C 44/02; B29C 44/56
[52] U.S. Cl. ............................. 264/343; 264/347
[58] Field of Search ..................... 264/340, 343, 264/346, 347, 349

[56] References Cited

U.S. PATENT DOCUMENTS 4,663,286  5/1987  Tsang et al. ............................ 435/178
4,923,645  5/1990  Tsang et al. ............................ 264/4.3

*Primary Examiner*—Jan H. Silbaugh
*Assistant Examiner*—Kenneth M. Jones
*Attorney, Agent, or Firm*—Sughrue, Mion, Zinn, Macpeak & Seas, PLLC

[57] ABSTRACT

A method for restoring a dried aqueous organic gel capsule which includes aqueous organic gel hardened with a metal ion and then has been solidified by drying, wherein the method comprises immersing the solidified capsule in an aqueous solution containing the metal ion.

4 Claims, No Drawings

METHOD FOR RESTORING DRIED AQUEOUS ORGANIC GEL CAPSULES

FIELD OF THE INVENTION

The present invention relates to a method for restoring dried capsules comprising aqueous organic gel, for example, the gel coat of gel-coated seeds.

BACKGROUND OF THE INVENTION

Encapsulation of seeds into capsules of aqueous organic gel, i.e., gel coating of seeds has recently come into use. The gel-coated seeds have an improved rate of germination owing to the water content of the gel coat. The gel coating makes it feasible to mechanize sowing of those seeds which are too small or have a non-spherical shape and are therefore unsuitable to mechanical sowing. Furthermore, various chemicals or fertilizers can be incorporated into the gel coating layer to produce remarkable effects on growth or yield.

Of the conventional gel-coated seeds, those having an aqueous organic gel coat hardened with a metal ion have been widely used because they can be prepared easily and inexpensively and the gel coat gives little adverse influence on germination.

However, the aqueous organic gel coat hardened with a metal ion loses its water content and solidifies during storage, or the gel coat is compellingly dried in order to prevent undesired germination. Such being the case, it is necessary to restore the solidified gel coat on use, for example, on mechanical sowing.

Accordingly, these dried gel capsules have been soaked in water for restoration of the solidified gel coat. However, as the gel capsules swell with water, the surface layer thereof tends to come off, and the capsules lose the surface smoothness. It would follow that the gel capsules undergo increased friction among themselves or with a metallic surface or a resin surface. Thus, gel capsules whose surface layer has fallen off have considerably poor handling properties and are liable to cause clogging during transportation or in a hopper of a seed drill.

Furthermore, the surface layer of gel capsules is relatively hard and strong and has a shape-retaining function. If the surface layer falls off, the strength of the gel capsule is seriously reduced to half or less of the initial strength, and the gel capsules are destroyed very often if handled carelessly after restoration.

When the substance to be encapsulated is a seed, it is required for the gel capsule to be see-through for letting an observer to visually observe the state of the seed. If the surface layer falls off, the gel capsules turn white to have reduced see-through visibility or, in some cases, to completely block visual observation.

SUMMARY OF THE INVENTION

An object of the present invention is to provide a method for restoring dried and solidified aqueous organic gel capsules while retaining their shape without involving damage to the surface layer.

This and other objects of the present invention have been accomplished by a method for restoring a dried aqueous organic gel capsule which comprises aqueous organic gel hardened with a metal ion and then has been solidified by drying, wherein the method comprises immersing the solidified capsule in an aqueous solution containing the metal ion which has participated in the hardening.

DETAILED DESCRIPTION OF THE INVENTION

The term "restore" as used herein means to restore the dried and solidified gel capsules to their original state (the state before drying). When all the following four conditions a) to d) are satisfied, the dried gel capsules are judged to have been "restored" to their original state.

a) Size:
Within ±15% of the initial size.

b) Appearance and visibility:
Gel capsules suffer from no fall-off of the surface layer and keep the surface smoothness. The state of the encapsulated substance can be seen through.

c) Weight:
Within ±10% of the initial weight.

d) Breaking Load:
Within ±10% of the initial breaking load.

The aqueous solution containing the metal ion which participated in hardening of gel capsules (hereinafter simply referred to as a "restoring solution") preferably has a metal ion concentration of from 1.4 mmol/l to less than 6.8 mmol/l. If the metal ion concentration is less than 1.4 mmol/l, the gel capsules swell too rapidly to be controlled with ease. If it is 6.8 mmol/l or more, the restoration of gel capsules is so slow that the gel capsules tend to disintegrate before they swell as a whole.

The restoring solution preferably has an osmosis pressure of from 4.3 to 4.5 atm. If the osmosis pressure is lower than 4.3 atm, the gel capsules tend to fall off. If it exceeds 4.5 atm, the restoration of gel capsules is so slow that the gel capsules tend to disintegrate before they swell as a whole.

The osmosis pressure can be obtained according to van't Hoff's equation: $PV=nRT$ (wherein P is an osmosis pressure; n is the mole number of solute; V is the volume of a solution; T is the absolute temperature of the solution ($T=293K$); and R is a gas constant), in which $R=0.0821$ (atm·l/(mol·K)), provided that all the sodium chloride and calcium chloride in the aqueous solution are dissociated.

Examples of the encapsulant, i.e., material forming aqueous organic gel, include sodium alginate and sodium polyacrylate. Other examples thereof include guar gum which reacts with a boric ion, anionic thickeners such as CMC, and carrageenan which reacts with a potassium ion.

The metal ion which acts to harden the gel-forming material includes divalent metals, e.g., calcium and barium, and aluminum. The metal ion is usually used as an aqueous solution of its chloride. The concentration of the metal ion is preferably 50 mmol or more per liter of the aqueous solution. Furthermore, it is preferably 30% by weight or less based on the aqueous solution.

Substances which can be used for osmosis pressure adjustment are selected from those which have no adverse influence on the encapsulated substance, for example, inorganic salts, such as sodium chloride, potassium nitrate, and ammonium sulfate. If the encapsulated substance is a seed, it is preferred to use potassium nitrate or ammonium nitrate; for it serves as fertilizer after planting to accelerate the growth of the plant.

The restoration method of the present invention can be applied to any aqueous organic gel capsules as long as the capsules are prepared by being hardened with a known metal ion. For example, the aqueous organic gel capsules can be prepared as follows.

An aqueous solution of the above-mentioned gel-forming material at an appropriate concentration is prepared. The concentration is preferably from 1 to 5% by weight. A droplet of the aqueous solution is formed at the tip of a capillary. A substance to be encapsulated, e.g., a seed, is introduced into the droplet by making use of the hollow part of the capillary, and the droplet containing the substance is dropped into an aqueous solution of the above-described metal salt for hardening to obtain a spherical capsule.

The gel capsules are then dried, for example, by a general drying means such as hot-air drying, whereupon the gel coat loses most of their water content and also their thickness to solidify in a film (reduced to 1/30 to 1/50 the thickness before drying) like a resin coat surrounding the substance. Upon solidification the breaking load greatly increases to several thousand to several tens of thousands times that before drying.

The restoration proceeds relatively rapidly when treated at high temperature, and slowly at low temperature. Accordingly, the rate of restoration can be controlled by adjusting the temperature of the restoring solution. As a matter of course, the temperature should be selected from the range that does not give adverse influence on the encapsulated substance. Taking gel-coated seeds for instance, the temperature of the restoring solution is in the range of from 0° C. to 50° C., preferably from 20° C. to 30° C.

According to the restoring method of the present invention, since the restoring solution used has a controlled osmosis pressure and contains an adequate amount of the metal ion which has participated in solidification of gel capsules, the difference in osmosis pressure between the inside and the outside the capsules is minimized. As a result, the rate of penetration of water into the inside is controlled, and the rate of diffusion of water inside the capsule is also controlled. Therefore, little strain occurs on restoration, and the gel capsules do not suffer from such defects that the capsules are broken and fall off or the surface layer falls off.

Furthermore, excessive swelling of the gel is avoided by properly adjusting the concentration of the metal ion which has participated in gel solidification, so that an appropriate rate of restoration can be secured.

The present invention will now be illustrated in greater detail with reference to Examples and Comparative Examples, but it should be understood that the invention is not construed as being limited thereto. Unless otherwise indicated, all the percents are by weight.

EXAMPLES 1 TO 3 AND COMPARATIVE EXAMPLES 1 TO 3

Sodium alginate was used as an aqueous organic gel-forming material, and calcium chloride was used as a hardening agent therefor.

A droplet comprising a 3% aqueous solution of sodium alginate was dropped from the tip of a capillary into a 10% aqueous solution of calcium chloride to obtain 130 empty gel capsules. The resulting gel capsules were transparent spheres of 12 mm in diameter, each weighing 0.9 g. The breaking load of 10 out of 130 droplets was measured with a rheometer equipped with a 2000 g load cell to give an average of 0.51 kgf.

In more detail, filter paper for non-slip was placed on lower disc stage of the measuring part of the rheometer, and a sample capsule was put thereon. The lower stage was lifted to crush the sample by compression with the upper disc stage. A breaking strength was obtained from the stress-strain curve.

Then, the gel capsules were dried in a hot-air drier at 60° C. to solidify. The dried gel capsules had a water content of 5% as measured by a Karl Fischer's method. Their breaking load was so high that it was unmeasurable with the rheometer having a 2000 g load cell.

A hundred gel capsules thus dried and solidified were immersed in 2 liters of each of the 5 kinds of solutions (solutions 1 to 5) and ion-exchanged water (solution 6) shown in Table 1 below, all kept at 25° C., for 24 hours. After the 24-hour immersion, the gel capsules were taken out and observed, and the breaking load of the capsules was measured with a rheometer. The results obtained are shown in Table 2 below.

TABLE 1

| Solution No. | Solute (Salt) | Concentration (wt %) | Ca Ion Concentration (mmol/l) | Osmosis Pressure (atm) |
| --- | --- | --- | --- | --- |
| 1 | $CaCl_2.2H_2O$ | 0.1 | 6.80 | 4.6 |
|   | NaCl | 0.5 |   |   |
| 2 | $CaCl_2.2H_2O$ | 0.08 | 5.44 | 4.5 |
|   | NaCl | 0.5 |   |   |
| 3 | $CaCl_2.2H_2O$ | 0.06 | 4.08 | 4.4 |
|   | NaCl | 0.5 |   |   |
| 4 | $CaCl_2.2H_2O$ | 0.04 | 2.72 | 4.3 |
|   | NaCl | 0.5 |   |   |
| 5 | $CaCl_2.2H_2O$ | 0.02 | 1.36 | 4.2 |
|   | NaCl | 0.5 |   |   |
| 6 | $CaCl_2.2H_2O$ | 0 | 0 | 0 |
|   | NaCl | 0 |   |   |

TABLE 2

| Example No. | Solution No. | Diameter (mm) | Appearance | Breaking Load (kgf) |
| --- | --- | --- | --- | --- |
| Comparative Example 1 | 1 | 8 | white turbid | 0.84 |
| Example 1 | 2 | 12 | restored | 0.55 |
| Example 2 | 3 | 12 | restored | 0.52 |
| Example 3 | 4 | 13 | restored | 0.48 |
| Comparative Example 2 | 5 | 18 | swollen, partly disintegrated | 0.11 |
| Comparative Example 3 | 6 | 20 | swollen, partly disintegrated | un-measurable |

The results in Table 2 show that the gel capsules treated by the method of the present invention completely restored the shape and strength before drying and solidification and are transparent. Although not shown in the table, the weight of the gel capsules of Examples 1 to 3 was 10% of that before drying and solidification.

Since the restoration of the gel capsules of Comparative Example 1 was incomplete at 24-hour immersion, the immersion was further continued for an additional 24-hour period, whereupon the gel capsules were swollen and partly disintegrated. The breaking load at this time was 0.15 kgf.

Thus, none of the gel capsules of Comparative Examples 1 to 3 restored their original state.

EXAMPLE 4 AND COMPARATIVE EXAMPLES 4 TO 6

Five hundred gel-coated seeds of spinach were prepared in the same manner as in Example 1, except that seeds of spinach were introduced into the droplet one by one (one seed in one droplet) by making use of the hollow part of the capillary. Each gel-coated seed had a diameter of 12 mm.

The strength of the resulting gel-coated seeds was 0.50 kgf as measured with a rheometer. The gel-coated seeds were dried under the same conditions as in Example 1.

A hundred out of 500 gel-coated seeds were immersed in 2 liters of solution 1, 3, 5 or 6 (Comparative Example 4, Example 4, Comparative Example 5 or Comparative Example 6, respectively) shown in Table 1 for 24 hours and taken out. The conditions and the strength of the immersed gel-coated seeds are shown in Table 3 below.

TABLE 3

| Example No. | Solution No. | Conditions of Gel Capsules | | Breaking Load (kgf) |
|---|---|---|---|---|
| | | Diameter (mm) | Appearance | |
| Comparative Example 4 | 1 | 8 | white turbid | 0.88 |
| Example 4 | 3 | 13 | restored | 0.50 |
| Comparative Example 5 | 5 | 17 | swollen, partly disintegrated | 0.13 |
| Comparative Example 6 | 6 | 20 | swollen, partly disintegrated | 0.11 |

Two sheets of filter paper were put in a petri dish of 12 cm in diameter, and 100 gel-coated seeds before drying and after the treatment with the restoring solution (i.e., the gel-coated seeds of Example 4 and Comparative Example 4 to 6) were scattered thereon. The petri dishes were put in an incubator set at 20° C. After 48-hour and 96-hour incubation, the number of the seeds which germinated (hereinafter referred to as a) and the number of the seeds which stuck their root out of the gel capsule (hereinafter referred to as b) were counted. The results obtained are shown in Table 4 below.

TABLE 4

| Example No. | After 48 hrs | | After 96 hrs | |
|---|---|---|---|---|
| | a[1)] | b | a[1)] | b |
| Comparative Example 4 | 13 | 0 | 64 | 0 |
| Example 4 | 38 | 6 | 91 | 52 |
| Comparative Example 5 | 21 | 0 | 76 | —[2)] |
| Comparative Example 6 | 19 | 0 | 71 | —[2)] |
| Gel-coated Seeds before Drying | 39 | 4 | 90 | 56 |

Notes:
[1)]The number a includes the number b.
[2)]Uncountable due to disintegration of the gel capsules.

The results in Table 4 show that the dried gel capsules, when treated by the restoration method of the present invention, can restore the rate of germination and the rate of root's sticking out to the levels of the gel-coated seeds before drying.

As apparent from the results shown in the above examples, the method of the present invention for restoring dried gel capsules makes the dried gel capsules restore their physical properties, shape, and see-through visibility which they originally possess before drying. When the method is applied to dried gel-coated seeds, the seeds can restore their rate of germination to the original level before drying.

While the invention has been described in detail and with reference to specific examples thereof, it will be apparent to one skilled in the art that various changes and modifications can be made therein without departing from the spirit and scope thereof.

What is claimed is:

1. A method for restoring a dried aqueous organic gel capsule which comprises an aqueous organic gel capsule which has been hardened with a metal ion and which has been solidified by drying, and which aqueous organic gel capsule has an initial size, an initial weight, an initial breaking load and an initial surface smoothness, wherein the method comprises:

immersing the solidified capsule in an aqueous solution containing the metal ion which has participated in the hardening of the capsule, such that the organic gel capsule is restored as follows:
a) to within ±15% of said initial size;
b) such that the gel capsule suffers from no fall-off of said surface layer and retains said surface smoothness;
c) to within ±10% of said initial weight; and
d) to within ±10% of said initial breaking load.

2. The method as claimed in claim 1, wherein the concentration of the metal ion in the aqueous solution is from 1.4 mmol/l to less than 6.8 mmol/l.

3. The method as claimed in claim 1, wherein the aqueous solution has an osmotic pressure of from 4.3 to 4.5 atm.

4. The method as claimed in claim 1, wherein the aqueous solution has a temperature of from 0° C. to 50° C.

* * * * *